US 8,856,027 B2

(12) United States Patent
Khunteta

(10) Patent No.: US 8,856,027 B2
(45) Date of Patent: Oct. 7, 2014

(54) SYSTEM AND METHOD FOR SLOW AD DETECTION

(75) Inventor: Sandeep Khunteta, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 784 days.

(21) Appl. No.: 12/575,257

(22) Filed: Oct. 7, 2009

(65) Prior Publication Data

US 2011/0083031 A1 Apr. 7, 2011

(51) Int. Cl.
*G06Q 30/00* (2012.01)
*G06Q 30/02* (2012.01)

(52) U.S. Cl.
CPC ............ *G06Q 30/02* (2013.01); *G06Q 30/0277* (2013.01)
USPC ....... 705/14.4; 705/14.73; 702/186; 370/229; 370/232; 370/234; 709/224; 709/232

(58) Field of Classification Search
CPC ..................... G06F 17/30899; G06Q 30/0277; H04L 67/2852; H04L 41/5009; H04L 43/0852; H04L 43/0864; H04L 43/50; H04L 67/101
USPC .......................................................... 705/14
See application file for complete search history.

(56) References Cited

U.S. PATENT DOCUMENTS

| | | | |
|---|---|---|---|
| 6,560,717 B1 * | 5/2003 | Scott et al. ..................... | 714/4.1 |
| 6,876,974 B1 * | 4/2005 | Marsh et al. ................ | 705/14.44 |
| 6,934,735 B1 * | 8/2005 | Emens et al. .................. | 709/203 |
| 6,973,490 B1 * | 12/2005 | Robertson et al. ............ | 709/224 |
| 7,373,376 B1 * | 5/2008 | Hamer et al. .................. | 709/203 |
| 7,827,257 B2 * | 11/2010 | Chu et al. ...................... | 709/223 |
| 2002/0198985 A1 * | 12/2002 | Fraenkel et al. .............. | 709/224 |
| 2003/0018450 A1 * | 1/2003 | Carley .......................... | 702/179 |
| 2003/0018626 A1 * | 1/2003 | Kay et al. .......................... | 707/3 |
| 2004/0236757 A1 * | 11/2004 | Caccavale et al. ............ | 707/100 |
| 2005/0076111 A1 * | 4/2005 | Cherkasova et al. .......... | 709/224 |
| 2005/0102414 A1 * | 5/2005 | Hares et al. .................... | 709/232 |
| 2005/0226149 A1 * | 10/2005 | Jacobson et al. .............. | 370/229 |
| 2008/0288518 A1 * | 11/2008 | Matsuo et al. ................. | 707/101 |
| 2009/0077173 A1 * | 3/2009 | Lowery et al. ................. | 709/203 |
| 2009/0094000 A1 * | 4/2009 | Krishnamurthy et al. .... | 702/186 |

* cited by examiner

*Primary Examiner* — Saba Dagnew
*Assistant Examiner* — Vincent Cao
(74) *Attorney, Agent, or Firm* — James J. DeCarlo; Greenberg Traurig, LLP

(57) ABSTRACT

A system and method for slow ad detection is provided. An ad tool receives information including round trip times to load web pages, in which each web page is loaded with at least one ad. Additionally, the ad tools calculates, for each ad, a mean round trip time to load each web page loaded with the respective ad. The ad tool then determines a predetermined number of the ads with highest mean round trip to load each of the web pages with the ad. Further, the ad tool enables testing of each of the predetermined number of ads to determine the round trip load time of each of the predetermined number of ads.

12 Claims, 8 Drawing Sheets

SYSTEM AND METHOD FOR SLOW AD DETECTION

TECHNICAL FIELD

The present invention relates generally to managing advertisements (ads) over a network, and in particular but not exclusively, to an apparatus, method, system, and manufacture for precise detection of slow ads served with a front end application.

BACKGROUND

Use of the Internet by the general public is gaining popularity. More and more people are getting access to the Internet and the vast amount of information that it provides. Along with the rapid increase in the number of Internet users, advertising on the Internet has consequently become an important priority for many advertisers.

As a result, for web portals and ISPs, a significant amount of revenue can be generated from displaying advertisers' ad banners or other types of ads on displayed websites or web pages. For example, for a preeminent portal such as Yahoo! which is visited daily by millions of users, considerable revenue can be made by displaying an advertiser's ad impressions on its websites or web pages.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
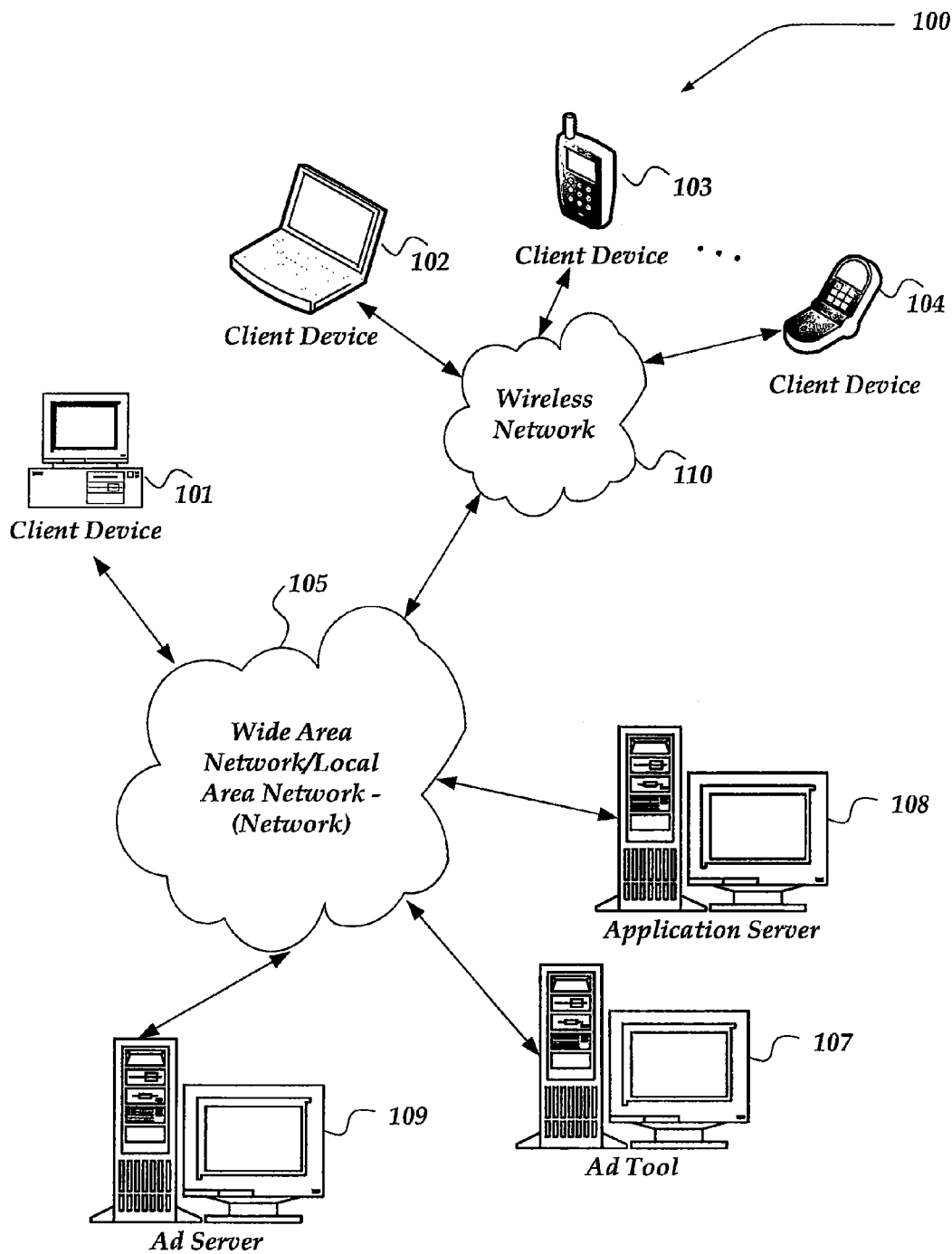
FIG. 1 shows a block diagram of an embodiment of a system for communicating over a network.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, certain embodiments of the invention are related to a system and method for an ad tool that receives information including round trip times to load web pages, in which each web page is loaded with at least one ad. Additionally, the ad tool calculates, for each ad, a mean round trip time to load each web page loaded with the respective ad. The ad tool then determines a predetermined number of the ads with highest mean round trip to load each of the web pages with the ad. Further, the ad tool enables testing of each of the predetermined number of ads to determine the round trip load time of each of the predetermined number of ads.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-104, application server 108, ad tool 107, and ad server 109.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

In one embodiment, client devices 101-104 may further provide information useable to detect a location of the client device. Such information may be provided in a message, or sent as a separate message to another computing device.

Client devices 101-104 may further be configured to include a client application that enables the user to log into a user account that may be managed by another computing device. Information provided either as part of a user account generation, a purchase, or other activity may result in providing various customer profile information. Such customer profile information may include, but is not limited to demographic information about a customer, and/or behavioral information about a customer and/or activities. In one embodiment, such customer profile information might be obtained through interactions of the customer with a brick-and-mortar service, or dynamically tracked based on a usage of the telecommunication carrier's products/services. However, customer profile information might also be obtained by monitoring activities such as purchase activities, network usage activities, or the like, over a network.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple ad server 109, application server 108, ad tool 107, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Application server 108 includes a network computing device that is configured to provide web pages in which ads are displayed. Ad tool 107 is a network device that performs various functions related to slow ad detection, in conjunction with other network devices over the network. Ad server 109 is a network device that stores ads that may be fetched by application server 108 over network 105.

Devices that may operate as application server 108 or other network devices such as ad tool 107 and ad server 109 include, but are not limited to personal computers, desktop computers, multiprocessor systems, microprocessor-based or programmable consumer electronics, network PCs, servers, network appliances, and the like.

Although application server 108 is illustrated as a distinct network device, the invention is not so limited. For example, a plurality of network devices may be configured to perform the operational aspects of application server 108.

Illustrative Client Environment

Figure 2:
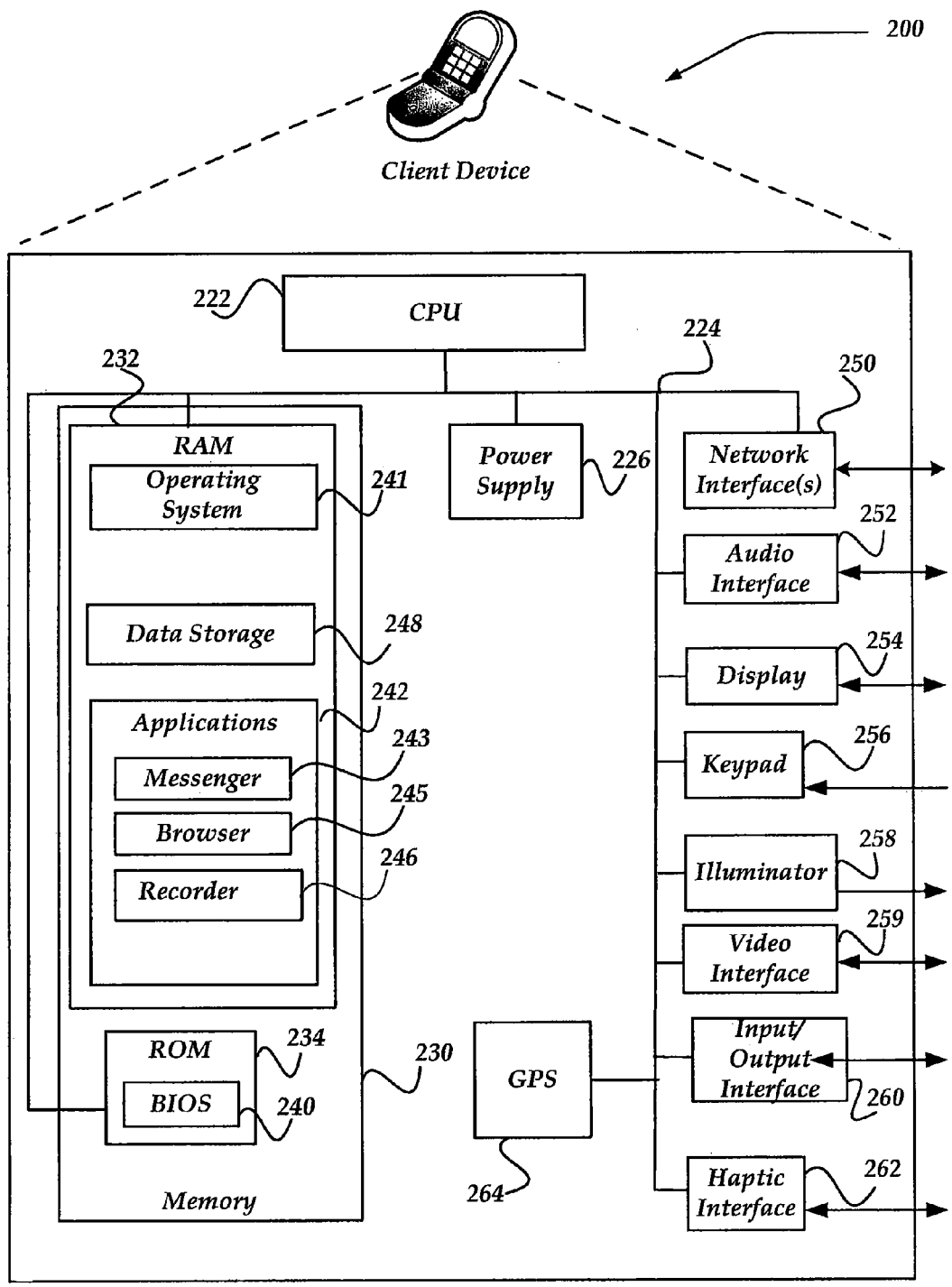
FIG. 2 illustrates a block diagram of an embodiment of a client device of FIG. 1.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light. In one embodiment, video interface 259 may interact with recorder 246 application to manage such actions.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data.

Applications 242 may include computer executable instructions which, when executed by client device 200, transmit, receive, and/or otherwise process messages (e.g., SMS, MMS, IM, email, and/or other messages), multimedia information, and enable telecommunication with another user of another client device. Other examples of application programs include calendars, browsers, email clients, IM applications, SMS applications, VOIP applications, contact managers, task managers, transcoders, database programs, word processing programs, security applications, spreadsheet programs, games, search programs, and so forth. Applications 242 may include, for example, messenger 243, and browser 245.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web-based languages may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, or the like. In another embodiment, messenger 243 may be a client application that is configured to integrate and employ a variety of messaging protocols.

Illustrative Network Device Environment

Figure 3:
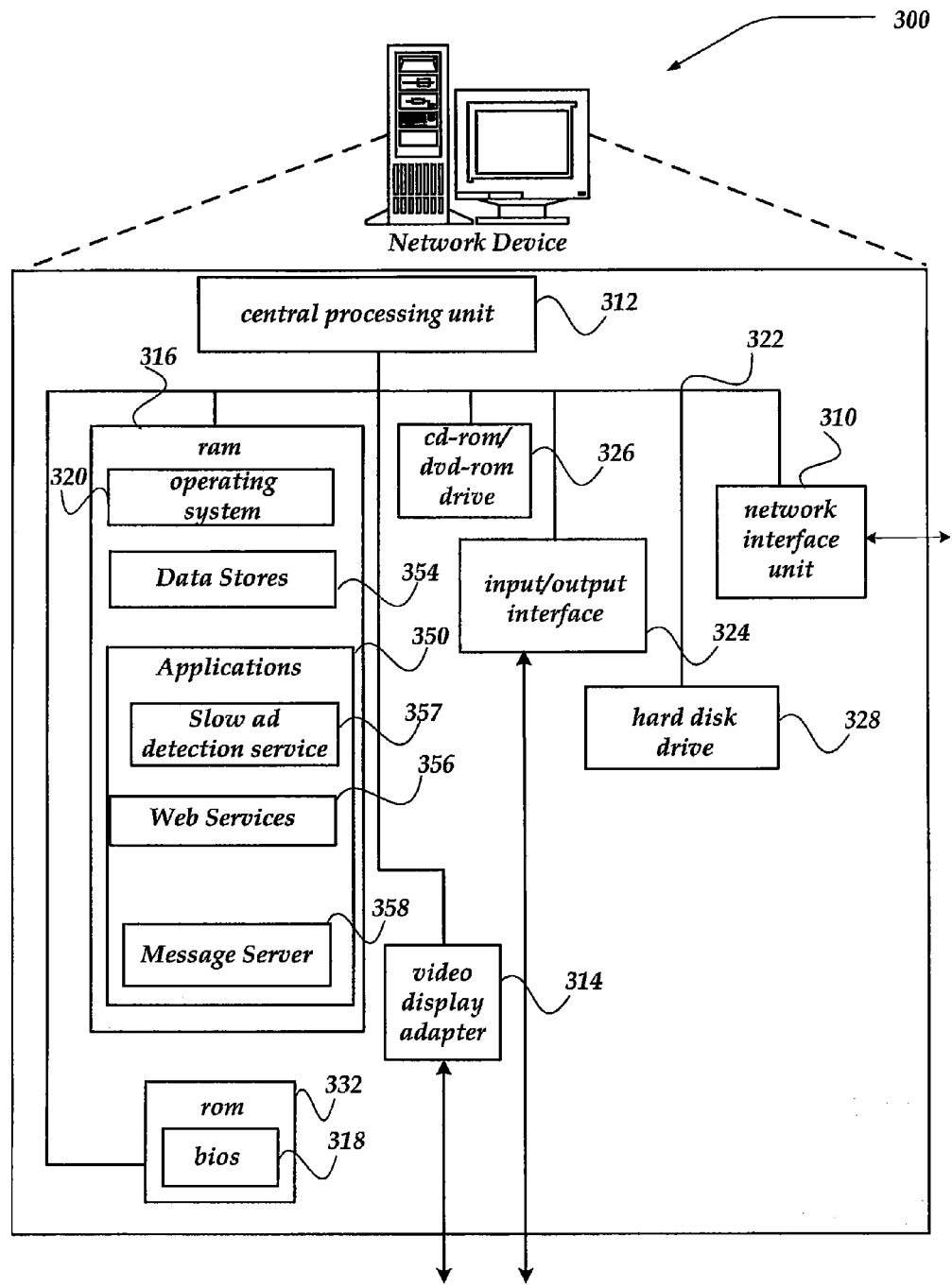
FIG. 3 shows a block diagram of an embodiment of a network device of FIG. 1.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, application server 108 or ad tool 107 of FIG. 1.

Network device 300 includes processing unit 312, video display adapter 314, input/output interface 324, and a mass memory, all in communication with each other via bus 322. The mass memory generally includes RAM 316, ROM 332, and one or more permanent mass storage devices, such as hard disk drive 328, tape drive, optical drive 326, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of, information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. For example, mass memory might include data store 354. Data store 354 may include virtually any mechanism usable for storing and managing data, including but not limited to a file, a folder, a document, or an application, such as a database, spreadsheet, or the like. Data store 354 may manage information that might include, but is not limited to web pages, information about members to a social networking activity, contact lists, identifiers, profile information, tags, labels, or the like, associated with a user, as well as scripts, applications, applets, and the like.

One or more applications 350 may be loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include web services 356, Message Server (MS) 358, and slow ad detection service 357.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like.

Message server 358 may include virtually any computing component or components configured and arranged to forward messages from message user agents, and/or other message servers, or to deliver messages to a local message store, such as data store 354, or the like. Thus, message server 358 may include a message transfer manager to communicate a message employing any of a variety of email protocols, including, but not limited to, Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types.

One embodiment of a process performed by slow ad detection service 357 is described further below in conjunction with FIG. 5.

Illustrative System

Figure 4:
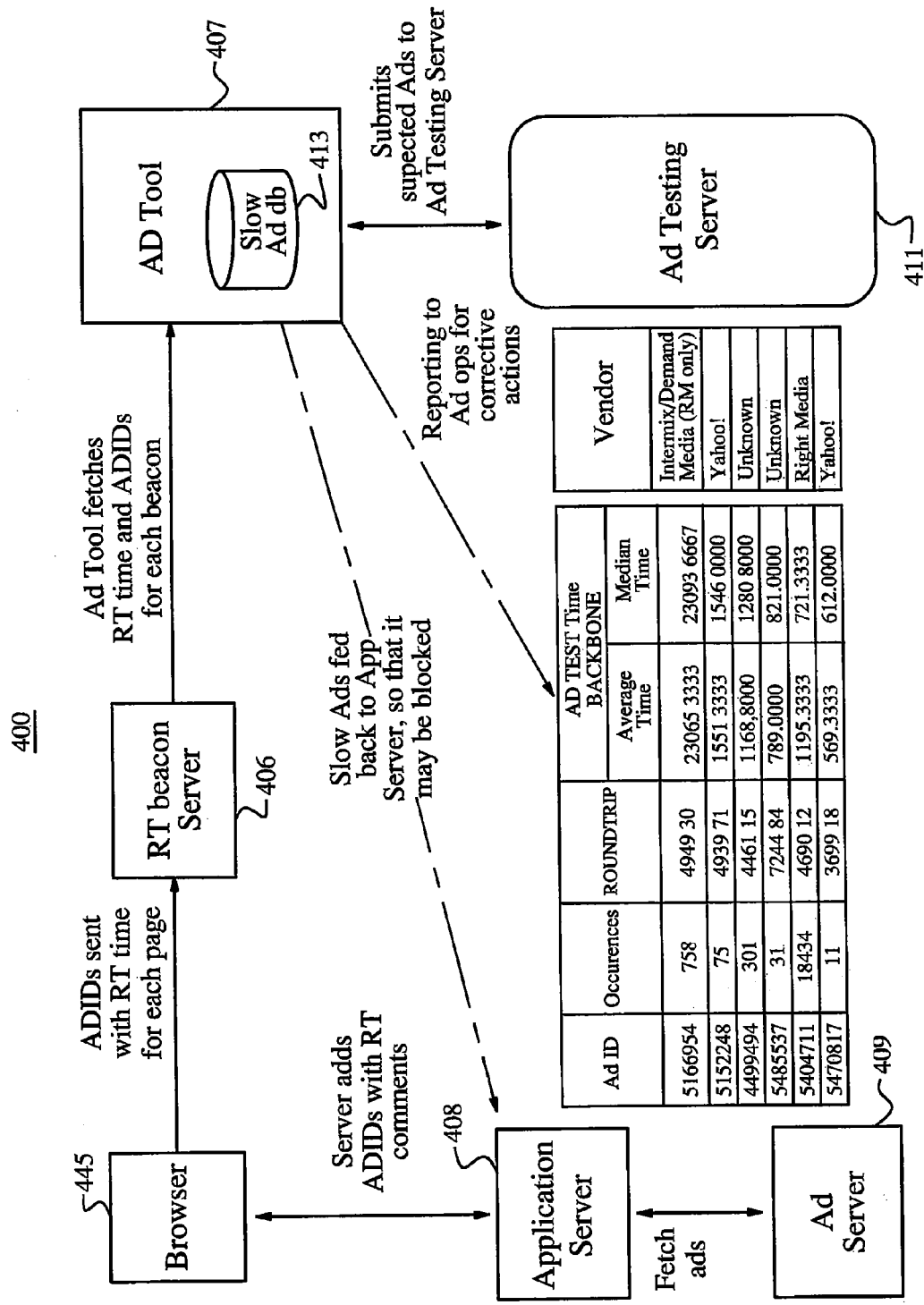
FIG. 4 illustrates a block diagram of an embodiment of the system of FIG. 1.

FIG. 4 illustrates a block diagram of an embodiment of a system (400) that may be employed as an embodiment of system 100 of FIG. 1. System 400 includes ad server 409, application server 408, RT beacon server 406, ad tool 407, and ad testing server 411. Browser 445 may be included on a client device (e.g., client device 101-104 of FIG. 1). Ad tool 407 may include a slow ad database 413. In some embodiments, the functionality of RT beacon server 406 is included in ad tool 407, rather than being a different device. Similarly, in some embodiments, the functionality of ad testing server 411 is included in ad tool 407, rather than being a separate device.

Ad server 409 is arranged to store ads that advertisers wish to have displayed. Browser 445 is arranged to request a web page, such as by a user typing in a web address or clicking on a link. Application server 408 is arranged to receive the request for the web page, collect information needed to provide the web page to the browser (including, in some cases, data specific to the user), and makes a call to ad server 408 to fetch appropriate ads to be displayed on the web page. Typically, about 2-5 ads are included on each web page. In some embodiments, application server 208 controls a front end application, such as webmail, and provides ads in addition to providing clients access to the front end application.

Ad server 409 is arranged to provide the ads to application server 408 in response to the call, and each of the ads includes an ad ID in the metadata of the ad. After receiving the ad content from ad server 409, application server 408 reads the ad content and extracts the ad IDs from each of the ads. Application server 408 then concatenates all of the ad IDs together and assigns it to be a variable called rt_comments in one embodiment. Application server 408 also adds a script ("RT script") which may include JavaScript code or the like for measuring the round trip (RT) load time.

Round trip time refers to the total time taken in loading a web page and all of its components (complete page content, images, scripts, advertisements etc.) on user's browser, starting from the time that the browser requests the web page. For example, if a user is seeing a page ('A') which shows him a link to go to another page ('B') and he clicks on that link, then RT time would be the time taken since user clicked on link to B (on page A) till page B is completely loaded in the user's browser.

Application server 408 then stitches together the web page, ad content, and RT script and sends it to browser 445. Browser 445 receives the server response and renders the whole page, including the ads. Browser 445 also executes the RT script, which computes the RT time for that page, and sends the RT time and rt_comments variable to RT beacon server 406. RT beacon server 406 collects the RT time and rt_comments data for each web page. Although FIG. 4 shows one RT beacon server, in some embodiments there are multiple RT beacon servers 406. RT beacon servers 406 receive and store the round trip information from all of the web pages.

In some embodiments, the RT script is used to compute the load time of all web pages at a website, such as Yahoo!, except for the first page visited by the user. For example, in some embodiments, when the user visits any Yahoo! page, the RT script notes the start time for the next page and stores this information in the browser as "start time" in a cookie. When the next page loads, then the RT script in that page captures the time when the page is done loading. Then the RT script looks for start time stored in browser cookie and calculates a difference of these two times to find RT time for current page.

In some embodiment, the RT time and rt_comments are sent to ad tool 407 directly and stored in slow ad database 413; in this case, RT beacon server 406 is optional and is not needed.

In some embodiments, ad tool 407 runs a script on a daily basis which makes a query to RT beacon server 406. Additionally, using this data, ad tool 407 computes, for each ad, the RT time for all pages where the ad was shown. After the script has finished, ad tool 407 has information about all ad IDs and average RT time for pages containing those ads. In some embodiments, this information is stored in slow ad database 413. Ad tool 407 selects a predetermined number of the ads for which the average time RT time for pages containing the ad are the highest. For example, in some embodiment, ad tool 407 selects the 500 ads with the highest overall page RT time. In some embodiments, ad tool 407 sends these ads to ad testing server 411 for further testing. These ads are suspected to be slow ads, but further testing is done by ad testing server 411 to determine which, if any, of these ads are slow ads.

Ad testing server 411 is arranged to perform ad testing to measure the RT time of each of these ads. Ad testing server 411 determines the RT time of each of these ads individually, rather than determining the RT time of a web page that loads the ad. Ad testing server 411 retrieves the deterministic time of each ad, which is relatively expensive. Because testing every ad would be prohibitively expensive, only the suspected slow ads are deterministically tested. In some embodiment, ad tool 407 performs the deterministic ad testing itself; in this case, ad testing server 411 is optional and is not needed. In some embodiments, ad testing server 411 is a measurement system such ad AdHawk using the Gomez API to run simulated tests on the ads to find the RT time of each of the individuals ads. In some embodiments, ad testing server 411 controls testing of the ad, so that each ad is tested over 2000 times over the course of the day, and from several different locations of the world. In some embodiments, each ad is frequently, such as once every 20 minutes, for 24 to 48 hours, from 50 or more different location around the world, in order to calculate the deterministic round trip loading time of each ad.

The information from the ad testing is sent from ad testing server 411 to ad tool 407, which may store the information in slow ad database 413. In some embodiments, there is an agreed-upon contractual limit between advertisers and the owners of the website for the maximum median RT load time for each ad, such as 800 ms. Ad tool 407 may take one or more actions on ads having a maximum median RT load time over the limit. In some embodiments, the ads having a maximum median RT load time over the limit are reported to ad operations for corrective actions. In some embodiments, information about ads over the limit are sent to application server 408, which blocks the ads over the limit from being provided on any further web pages. In some embodiments, the data sent to application server 408 is not simply bad ads for the day, but the ads identified as slow over the last 15 days, or some other time window. In some embodiments, an average over 15 days, or some other time window, is used rather than just data for the day.

FIG. 4 also shows a table illustrating various information that may be stored in the ad tool. As shown, the ad ID of each ad may be stored. Also, information about the total number of occurrences of the ad may be shown. Further, the RT time of each web page in which the ads occur may be shown. This is indicated in the column "ROUNDTRIP" in the table. Additionally, the average and median RT time for each ad as calculated by ad testing server 411 is shown in the art. This is shown in the column "AD TEST TIME—BACKBONE" (with subheading of average time for the average time and median time for the median time). Additionally, the chart shows the vendor of each ad.

Illustrative Processes

Figure 5:
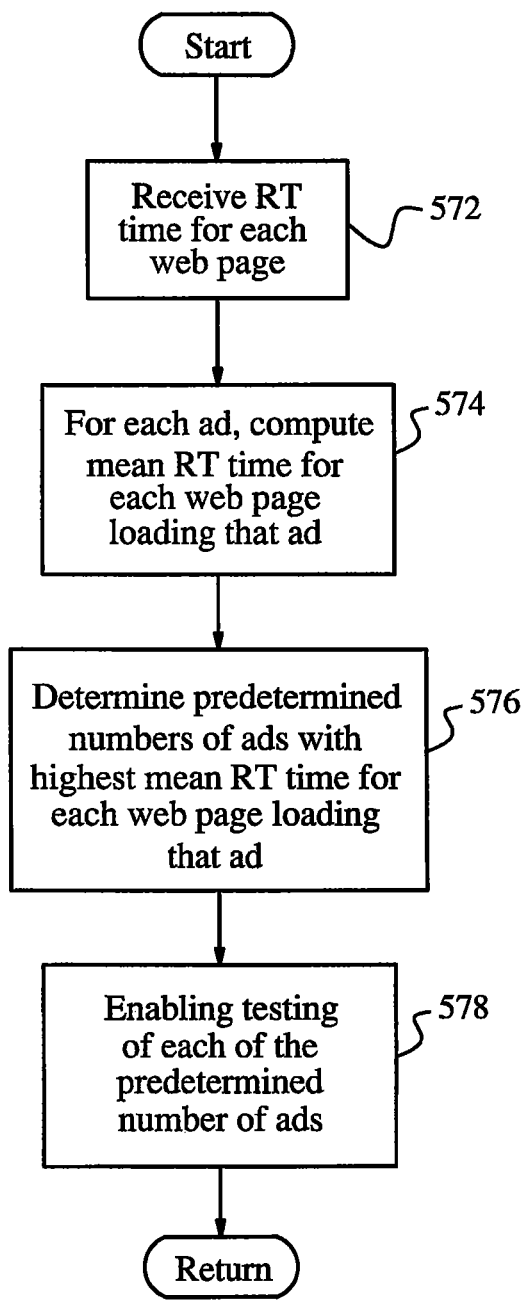
FIG. 5 shows a flow chart of an embodiment of a process for slow ad detection.

FIG. 5 illustrates a block diagram of an embodiment of a process (570) of slow ad detection. In one embodiment, process 570 is performed by ad tool 407 of FIG. 4. Process 570 may be used for slow ad detection for a front end application that provides web pages, where each page includes one or more ads each time the web page is loaded. After a start block, the process proceeds to block 572, where, the RT time for each web page that is served by a front end application with one or more ads provided is received. In some embodiments, 2-5 ads are included on each web page. In some embodiments, the ads are provided by an ad server. In some embodiments, each RT time is computed by a browser by running a script that was added by the application server, and the RT time is sent by the browser, with the RT being sent from the browser directly to the ad tool, or from the browser to the RT beacon server, where the RT tool fetches the RT times from the RT beacon server. In each case, the ad tool receives the RT times. The process then moves to block 574 where, for each ad that is provided by the ad server to the front end application, the mean RT time to load all web pages that included that ad is calculated.

The process then advances to block 576, where a predetermined number of ads with the highest mean RT load time are determined. For example, in some embodiments, the 500 ads with the highest mean RT load time to load a web page that included that ad are determined. In other embodiments, some predetermined number other than 500 is used. The process then advances to block 578, where testing of each of the predetermined number of ads is enabled. For example, in some embodiments, each of the predetermined number of ads it sent to the ad server for testing. In other embodiments, the ad tool itself performs the testing. The process then moves to a return block, where other processing is resumed.

Figure 6:
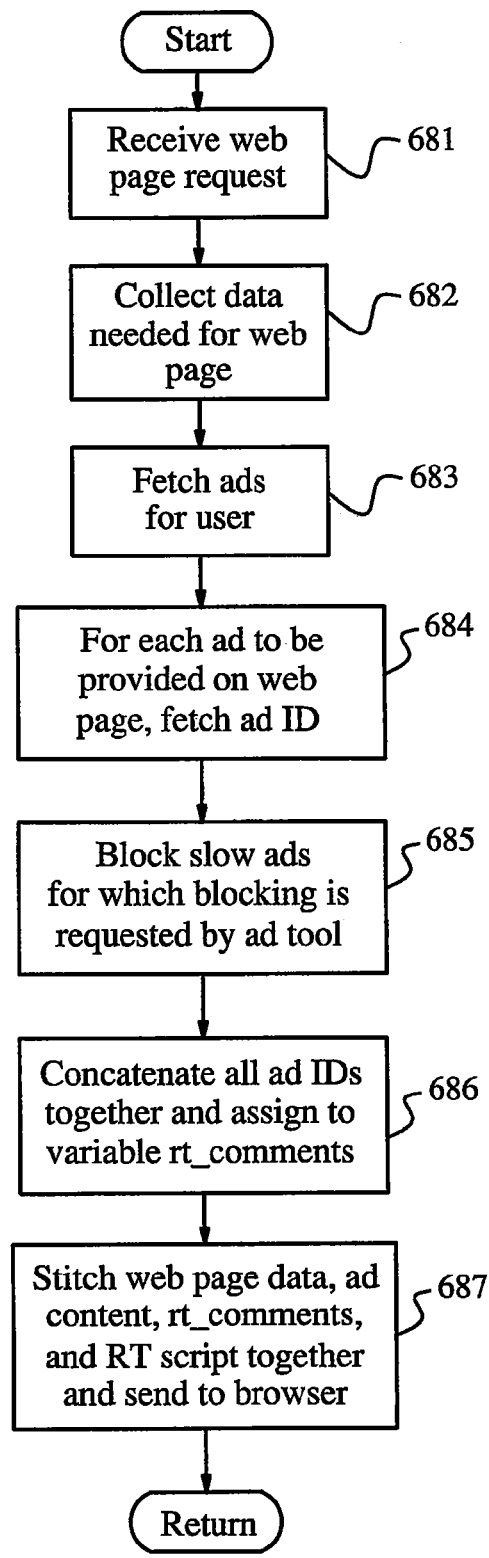
FIG. 6 illustrates a flow chart of a process that may be employed by an embodiment of the application server of FIG. 4.

FIG. 6 illustrates a flow chart of process 680, which may be employed by an embodiment of application server 408 of FIG. 4. After a start block, the process proceeds to block 681, where a web page request is received (e.g., from a browser such a browser 445 of FIG. 4). The process then moves to block 682, where data needed to create the web page is collected. The process then advances to block 683, where ads for the user to be displayed on the web page are fetched.

The process then moves to block 684, where the ad ID is extracted for each ad that is to be provided on the web page. The process then proceeds to block 685, where ads identified by the ad tool as slow ads that should be blocked (for example, at block 899 of FIG. 8) are blocked. The process then advances to block 686, where each of the ad IDs is concatenated together and assigned to the variable rt_comments. The process then advances to block 687, where the web page data, ad content, rt_comments, and RT script are stitched together and sent to the browser that requested the web page. The process then proceeds to a return block, where other processing is resumed.

Figure 7:
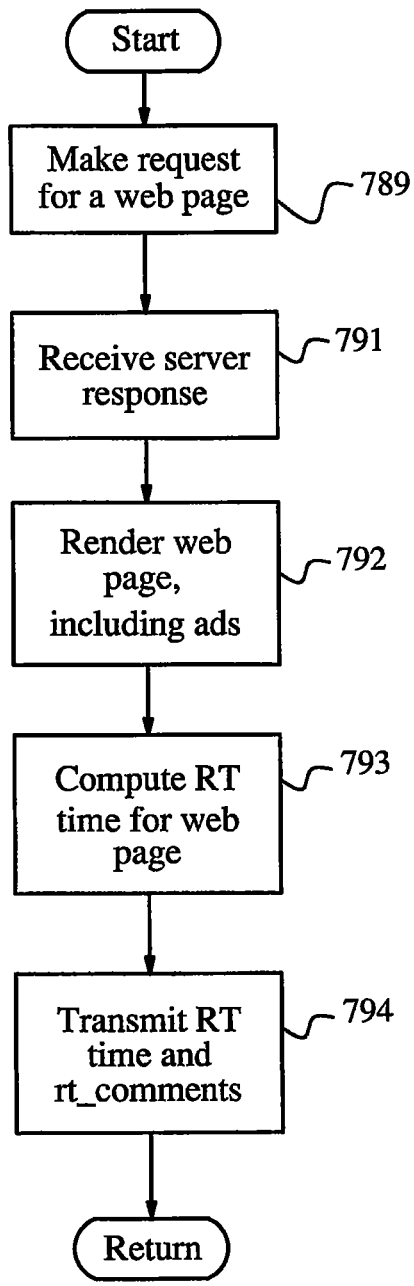
FIG. 7 shows a flow chart of an embodiment of a process that may be employed by an embodiment of the browser of FIG. 4.

FIG. 7 shows a flow chart of an embodiment of process 790, which may be employed by an embodiment of browser 445 of FIG. 4. After a start block, the process proceeds to block 789, where a request for a web page is made. The process then moves to block 791, where a server response to the request for the web page is received. The process then advances to block 792, where the web page, including ads, is rendered. The process then proceeds to block 793, where the RT time for the web page is computed. The process then moves to block 794, where the RT time and rt_comments is transmitted. The process then, advances to a return block, where other processing is resumed.

Figure 8:
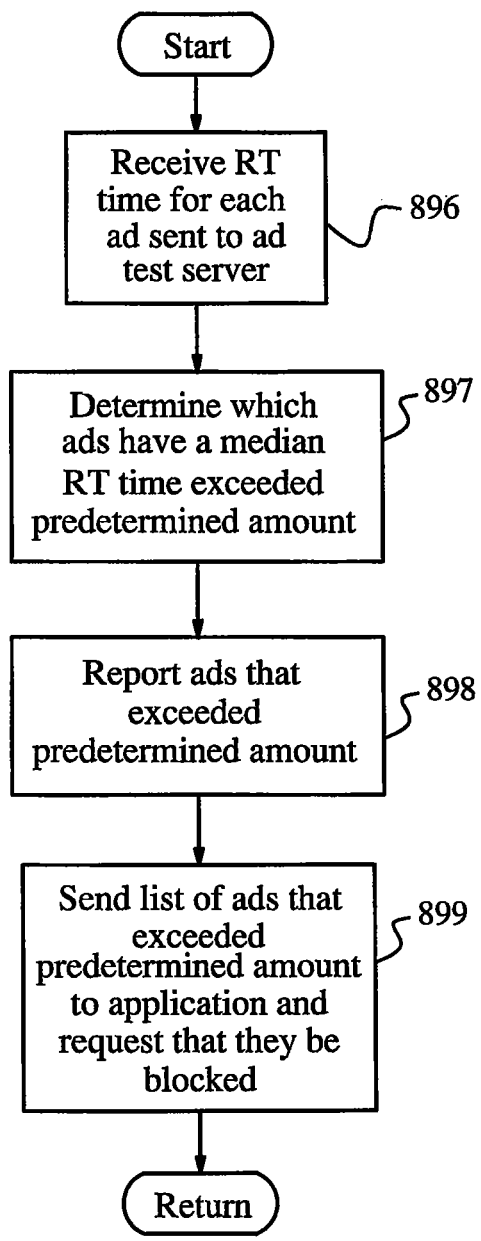
FIG. 8 illustrates a flow chart of an embodiment of a process that may be employed by an embodiment of the ad tool of FIG. 4, in accordance with aspects of the present invention.

FIG. 8 illustrates a flow chart of an embodiment of process 895, which may be employed by an embodiment of ad tool 407 of FIG. 4. For example, in some embodiments, ad tool 407 of FIG. 4 performs process 570 of FIG. 5, and as part of that process, suspected slow ads are sent to ad testing server 411. In some of these embodiments, after ad testing server 411 tests the suspected slow ads, and sends the results back to ad tool 407, and then ad tool 407 performs process 895.

After a start block, the process proceeds to block 896, where the RT time for each ad sent to the ad test server is received. The process then moves to block 897, where it is determined which ads had a median RT time exceeding the predetermined amount. The process then advances to block 898, where ads that exceeded the predetermined amount are reported for further action. The process then proceeds to block 899, where a list of ads that exceeded the predetermination amount is sent to the application server and a request is made that those ads be blocked by the application server. Block 899 is optional. The process then moves to a return block, where other processing is resumed.

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A method comprising:
for each of a plurality of web pages, receiving a round trip time to load the web page with at least one ad selected from a plurality of ads; and
employing one or more processors to perform actions, including:
obtaining, for each of the plurality of ads, a mean round trip time to load, a respective ad's mean round trip time to load is based on the round trip time to load of each web page loaded with the respective ad;
determining a predetermined number of the plurality of ads for which the obtained mean round trip time to load is highest, the predetermined number representing a subset of ads from the plurality of ads;
testing of each ad of the predetermined number of the plurality of ads, the testing including measuring a plurality of round trip load times of the each ad to determine a median round trip load time of the each ad;
blocking from adding to a web page each ad determined to have a corresponding median round trip load time that exceeds a predetermined amount; and
in response to a request for the web page, serving the web page absent the blocked ads.

2. The method of claim 1, wherein
testing of each ad of the predetermined number of the plurality of ads includes controlling the testing of the each ad by testing the round trip (RT) time to load of the each ad individually from at least two different locations at least two different times.

3. The method of claim 1, further comprising:
serving a script to a browser, wherein the script is executable by the browser to calculate a round trip time to load of at least one web page loaded by the browser;
receiving a request for a web page from a browser;
fetching at least two ads selected from the plurality of ads to be served with the web page; and
serving the web page and the selected ads to the browser.

4. The method of claim 1, further comprising:
in response to the testing of each ad of the predetermined number of the plurality of ads, receiving, for the each ad of the predetermined number of the plurality of ads, the median round trip load time of the lad;
for the each ad of the predetermined number of the plurality of ads, determining which o the predetermined number of the plurality of ads has a received median round trip load time that exceed the predetermined amount.

5. A server comprising:
a transceiver that is arranged to receive information over a network including, for each of a plurality of web pages, a round trip time to load the web page with at least one ad selected from a plurality of ads; and
a processor that is arranged to enable actions, including:
obtaining, for each of the plurality of ads, a mean round trip time to load, a respective ad's mean round trip time to load is based on the round trip time to load of each web page loaded with the respective ad;
determining a predetermined number of the plurality of ads for which the obtained mean round trip time to load is highest, the predetermined number representing less than the plurality of ads;
testing of each ad of the predetermined number of the plurality of ads, the testing including measuring a plurality of round trip load times of the each ad to determine a median round trip load time of the each ad;
blocking from adding to a web page each ad determined to have a corresponding median round trip load time that exceeds a predetermined amount; and
in response to a request for the web page, serving the web page absent the blocked ads.

6. The server device of claim 5, wherein the processor is arranged to perform further actions, including:
in response to the testing of each ad of the predetermined number of the plurality of ads, receiving, for the each ad of the predetermined number of the plurality of ads, the median round trip load time of the ads; and
for the each ad of the predetermined number of the plurality of ads, determining which of the predetermined number of the plurality of ads has a received median round trip load time that exceeds the predetermined amount.

7. A computer readable non-transitory storage medium for tangibly storing thereon computer readable program code, which when executed causes one or more processors to perform actions comprising:
for each of a plurality of web pages, receiving a round trip time to load the web page with at least one ad selected from a plurality of ads;
obtaining, for each of the plurality of ads, a mean round trip time to load, a respective ad's mean round trip time to load is based on the round trip time to load of each web page loaded with the respective ad;
determining a predetermined number of the plurality of ads for which the calculated mean round trip time to load is highest, the predetermined number representing a subset of ads of the plurality of ads;
testing of each ad of the predetermined number of the plurality of ads, the testing including measuring a plurality of round trip load times of the each ad to determine a median round trip load time of the each ad;
sending a request to block from adding to a web page each ad determined to have a corresponding median round trip load time that exceeds a predetermined amount; and
in response to a request for the web page, serving the web page absent the blocked ads.

8. The computer readable non-transitory storage medium of claim 7, the actions further comprising:
in response to the testing of each ad of the predetermined number of the plurality of ads, receiving, for the each ad of the predetermined number of the plurality of ads, the median round trip load time of the ads; and
for the each ad of the predetermined number of the plurality of ads, determining which of the predetermined number of the plurality of ads has a received median round trip load time that exceeds the predetermined amount.

9. A system comprising:
an application server that is arranged to perform actions, including:
serving a script arranged to compute round trip times to load web pages;
receiving a request for a web page;
selecting ads from a plurality of ads to serve with the requested web page;
serving the selected web page and the selected ads in response to the request; and
receiving, from the script, a round trip time to load the served web page;
an ad tool that is arranged to perform actions, including:
for each of a plurality of web pages, receiving a round trip time to load the web page with at least one ad selected from a plurality of ads;
obtaining, for each of the plurality of ads, a mean round trip time to load, a respective ad's mean round trip time to load is based on the round trip time to load of each web page loaded with the respective ad;
determining a predetermined number of the plurality of ads for which the obtained mean round trip to load is highest, the predetermined number representing a subset of the plurality of ads; and
testing of each ad of the predetermined number of the plurality of ads, the testing including measuring a plurality of round trip load times of the each ad to determine a median round trip load time of the each ad; and
wherein the application server blocks from adding to a web page each ad determined to have a corresponding median round trip load time that exceeds a predetermined amount, and in response to a request for the web page, serves the web page absent the blocked ads.

10. The system of claim 9, further comprising:
an ad server that is arranged to control testing of each ad by testing the round trip (RT) time to load of each ad individually from at least two different locations at least two different times, wherein the ad tool is arranged to enable testing of the each ad of the predetermined number of the plurality of ads by transmitting the predetermined number of the plurality of ads to the ad server.

11. The system of claim 9, further comprising:
an ad server that is arranged to store the plurality of ads, wherein the application is further arranged to fetch the selected ads from the ad server.

12. The system of claim 9, wherein the ad tool is arranged to perform further actions, including:
in response to the testing of each ad of the predetermined number of the plurality of ads, receiving, for the each ad of the predetermined number of the plurality of ads, the median round trip load time of the ad; and
for the each ad of the predetermined number of the plurality of ads, determining which of the predetermined number of the plurality of ads has a received median round trip load time that exceeds the predetermined amount.

* * * * *